US010687269B2

(12) United States Patent
Niu et al.

(10) Patent No.: US 10,687,269 B2
(45) Date of Patent: Jun. 16, 2020

(54) ARCHITECTURE FOR WIRELESS NETWORK ACCESS (71) Applicant: Apple Inc., Cupertino, CA (US)

(72) Inventors: Huaning Niu, Milpitas, CA (US);
Hyejung Jung, Palatine, IL (US); Qian Li, Hillsboro, OR (US); Yuan Zhu, Beijing (CN)

(73) Assignee: Apple Inc., Cupertino, CA (US)

( * ) Notice: Subject to any disclaimer, the term of this patent is extended or adjusted under 35 U.S.C. 154(b) by 64 days.

(21) Appl. No.: 15/765,540

(22) PCT Filed: Oct. 9, 2015

(86) PCT No.: PCT/US2015/054879
§ 371 (c)(1),
(2) Date: Apr. 3, 2018

(87) PCT Pub. No.: WO2017/062028
PCT Pub. Date: Apr. 13, 2017

(65) Prior Publication Data
US 2018/0310230 A1    Oct. 25, 2018

(51) Int. Cl.
H04W 4/00         (2018.01)
H04W 48/12        (2009.01)
(Continued)

(52) U.S. Cl.
CPC .......... *H04W 48/12* (2013.01); *H04B 7/0617* (2013.01); *H04L 5/0053* (2013.01);
(Continued)

(58) Field of Classification Search
None
See application file for complete search history.

(56) References Cited

U.S. PATENT DOCUMENTS 10,015,662 B2 * 7/2018 You ...................... H04J 11/0069
2012/0208541 A1 * 8/2012 Luo ...................... H04B 7/0626
455/437

(Continued)

FOREIGN PATENT DOCUMENTS

EP           3360628        8/2018
WO     2013044970 A1        4/2013
(Continued)

OTHER PUBLICATIONS

International Preliminary Report on Patentability, PCT/US2015/054879, dated Apr. 19, 2019, 7 pages.
(Continued)

*Primary Examiner* — Bob A Phunkulh
(74) *Attorney, Agent, or Firm* — Jaffery Watson Mendonsa & Hamilton LLP (57) ABSTRACT An architecture for wireless network access is described. In one example, a network entity comprises processing circuitry to define a downlink control channel comprising a synchronization signal, a physical broadcast channel (PBCH), and at least one slot for contention resolution or device-to-device (D2D) discovery and link setup, and broadcast a synchronization signal comprising the control channel from a plurality of remote radio heads (RRH). Other examples are also disclosed and claimed.

22 Claims, 9 Drawing Sheets (51) Int. Cl.
*H04W 76/14* (2018.01)
*H04W 74/08* (2009.01)
*H04L 5/00* (2006.01)
*H04B 7/06* (2006.01)
*H04W 88/08* (2009.01)

(52) U.S. Cl.
CPC ....... *H04W 74/0833* (2013.01); *H04W 76/14* (2018.02); *H04L 5/0007* (2013.01); *H04L 5/0033* (2013.01); *H04W 88/085* (2013.01)

(56) References Cited

U.S. PATENT DOCUMENTS

| | | | |
|---|---|---|---|
| 2012/0275353 A1* | 11/2012 | Cave | H01L 27/14689 370/280 |
| 2012/0281554 A1* | 11/2012 | Gao | H04L 5/0053 370/252 |
| 2012/0281555 A1* | 11/2012 | Gao | H04L 5/0051 370/252 |
| 2012/0281567 A1* | 11/2012 | Gao | H04B 7/0626 370/252 |
| 2013/0083729 A1* | 4/2013 | Xu | H04W 52/325 370/328 |
| 2013/0155847 A1 | 6/2013 | Li et al. | |
| 2013/0242951 A1 | 9/2013 | Lee et al. | |
| 2014/0153432 A1* | 6/2014 | Zhang | H04L 1/0027 370/252 |
| 2015/0045078 A1 | 2/2015 | Lee et al. | |
| 2015/0236932 A1* | 8/2015 | Yu | H04L 43/0835 370/252 |
| 2016/0226639 A1* | 8/2016 | Xiong | H04L 5/0053 |
| 2016/0234702 A1* | 8/2016 | Heo | H04W 76/38 |
| 2016/0294595 A1* | 10/2016 | Harada | H04L 27/2646 |
| 2017/0005764 A1* | 1/2017 | Park | H04J 11/005 |
| 2017/0019910 A1* | 1/2017 | Seo | H04W 76/10 |
| 2017/0188319 A1* | 6/2017 | Seo | H04W 56/00 |
| 2017/0202025 A1* | 7/2017 | Ouchi | H04W 16/32 |
| 2017/0207897 A1* | 7/2017 | Kim | H04W 24/10 |
| 2018/0007562 A1* | 1/2018 | Auer | H04W 16/32 |

FOREIGN PATENT DOCUMENTS

| | | |
|---|---|---|
| WO | 2015/021318 A2 | 2/2015 |
| WO | 2017/062028 A1 | 4/2017 |

OTHER PUBLICATIONS

Extended European Search Report, International Application No. PCT/US2015/054879, dated May 6, 2019, 11 pages.
International Search Report and Written Opinion received for International Application No. PCT/US2015/054879, dated Jul. 22, 2016, 10 pages.
Catt, "Discussion on Synchronization for D2D Operation," Discusion, Nov. 11-15, 2015, 5 pages, 3GPPTSG RAN WG1 Meeting #75, San Francisco, CA, USA.
Intel Corporation, "Coverage Enhancement of PRACH for Low Cost MTC," Discussion, Nov. 11-15, 2015, 8 pages, 3GPPTSG RAN WG1 Meeting #75, San Francisco, CA, USA.
Intel Corporation, "Synchronization Signal Design and Performance for Nb-IoT," Discussion, Oct. 5-9, 2015, 5 pages, Malmo, Sweden.

* cited by examiner

ARCHITECTURE FOR WIRELESS NETWORK ACCESS

RELATED APPLICATIONS

This application claims priority under 35 U.S.C. § 371 to International Application No. PCT/US2015/054879 filed Oct. 9, 2015, entitled ARCHITECTURE FOR WIRELESS NETWORK ACCESS. The entire disclosure(s) of these documents are incorporated by reference herein for all purposes.

FIELD

The present disclosure generally relates to the field of electronic communication. More particularly, aspects generally relate to an architecture for wireless network access in communication systems.

BACKGROUND

Communication networks which utilize millimeter Wave (mmWave) small cell technology have the potential to provide high date rate due to the wide bandwidth available to such networks. Designing and implementing standalone mmWave access networks is complicated, at least in part, because communication in high frequency bands suffer high pathloss and therefore must exploit antenna gains to boost link budget. Further, significant amounts of control information must be broadcast or transmitted in omni-directional mode before a beam is acquired. Efficient transmission of control information is an important aspect in implementing communication networks which utilize standalone mmWave access technology.

BRIEF DESCRIPTION OF THE DRAWINGS

The detailed description is provided with reference to the accompanying figures. The use of the same reference numbers in different figures indicates similar or identical items.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following description, numerous specific details are set forth in order to provide a thorough understanding of various examples. However, various examples may be practiced without the specific details. In other instances, well-known methods, procedures, components, and circuits have not been described in detail so as not to obscure the particular examples. Further, various aspects of examples may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. Additionally, the word "exemplary" is used herein to mean "serving as an example, instance, or illustration." Any embodiment described herein as "exemplary" is not to be construed as necessarily preferred or advantageous over other embodiments.

Various operations may be described as multiple discrete operations in turn and in a manner that is most helpful in understanding the claimed subject matter. The order of description, however, should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments.

Figure 1:
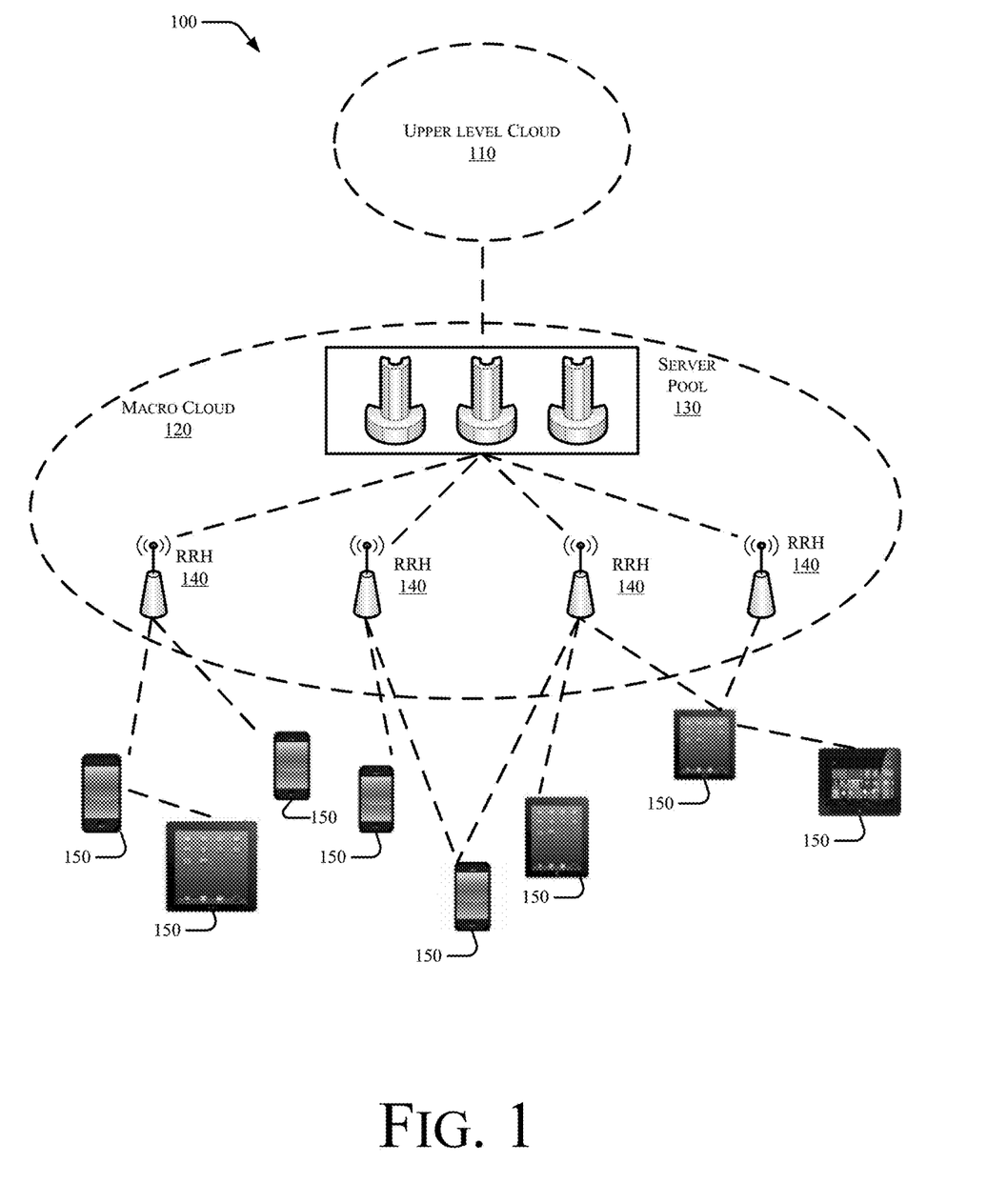
FIG. 1 is a schematic, block diagram illustration of an architecture for an exemplary communication system in accordance with various examples discussed herein.

FIG. 1 is a schematic, block diagram illustration of an architecture for an exemplary communication system 100 in accordance with various examples discussed herein. System 100 comprises an macro cloud 120 which includes a server pool 130. Server pool communicatively coupled to a plurality of remote radio heads (RRH) 140. Remote radio heads 140 may be communicatively coupled to a plurality of user equipment (UEs) 150 served by system 100. The macro cloud 120 may be communicatively coupled to one or more upper level clouds 110.

Each UE 150 may be communicatively coupled to one or more RRH 140. Likewise, each RRH 140 may be communicatively coupled to one or more UE 150. Further, one or more UEs 150 may be communicatively coupled to one another, such that a UE 150 provides tethered access to the communication system 100. A user equipment 150 can embodied as, but is not limited to, a mobile station (MS), a subscriber station (SS), a Machine-to-Machine-type (M2M-type) device, customer premises equipment (CPE), a notebook-type computer, a tablet-type device, a cellular telephone, a smart-type device, a smartphone, a personal digital assistant, an information-handling system, or the like as described herein.

Figure 2A:
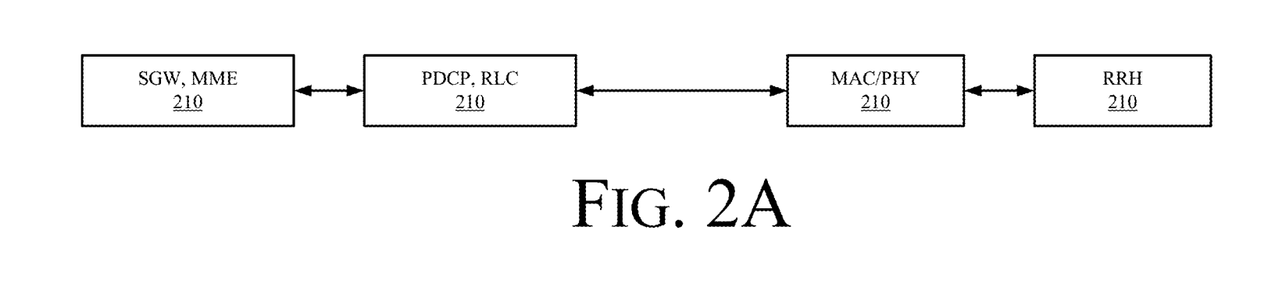
FIGS. 2A-2C are schematic, block diagram illustration of architectures for an exemplary communication system in accordance with various examples discussed herein.
Figure 2B:
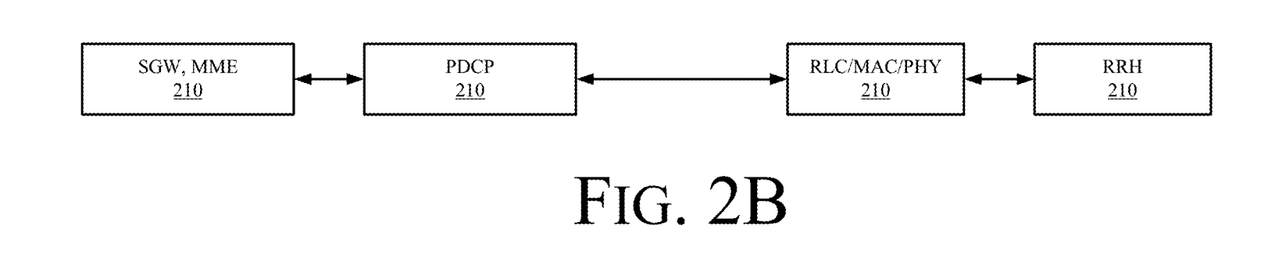
Figure 2C:
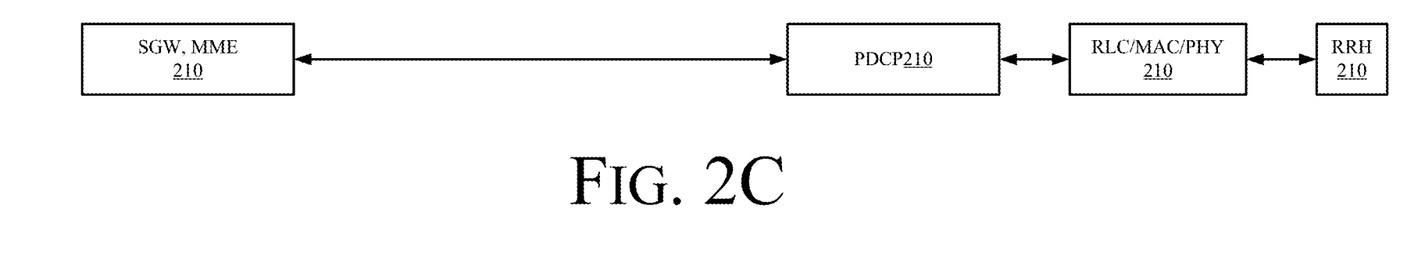

FIGS. 2A-2C are schematic, block diagram illustrations of architectures for an exemplary communication system in accordance with various examples discussed herein. In all three architectures for mmWave RAT, PHY/MAC processing is performed at the remote radio head (RRH) 140. This partition can reduce the hybrid automatic repeat request (HARQ) processing time and reduce fronthaul delay and bandwidth requirement.

In the architecture depicted in FIG. 2A, the radio link control (RLC) layer processing is performed in the server pool 130. In this case, when a UE 150 is moving and a different RRH 140 is selected to serve the UE 150, the RLC process will be the same. In other word, automatic repeat request (ARQ) retransmission will not be interrupted during a switch between a first RRH 140 and a second RRH 140. In the architecture depicted in FIG. 2B, the RLC layer processing is performed in the RRH 140. When a UE 150 switches between a first RRH 140 and a second RRH 140, a different RLC process will be initiated, any unfinished ARQ process will be terminated. The architecture depicted in FIG. 2C corresponds to an eNB architecture. No L2/L3 pooling gain is available in the server pool.

In some examples the communication system 100 may utilize a separate physical control channel design with dedicated bandwidth for control information transmission. The control channel transmits the necessary operational information e.g., master information block (MIB), SIG, physical broadcast channel (PBCH), paging, contention based random access etc. The broadcasting information is transmitted from all the RRH 140 to obtain single frequency network (SFN) gain. The control channel is transmitted in an omni-directional fashion.

The control channel can be frequency division multiplexed (FDM) or time division multiplexed (TDM) with a data channel. When the control channel is frequency division multiplexed with the data channel, a separate radio frequency (RF) and baseband chain may be required. The dedicated bandwidth for the control channel can be either on a separate frequency band, or part of the frequency band adjacent to the data plane channel. For example in the 28 GHz band, the control channel can be one of 75 MHz channel on the block B. For 39 GHz band, the control channel can be one or two of the 50 MHz block. Defining a separate carrier in a different band that is far away from data channel may not be desirable, as acquired beam direction from the control channel may not be valid in a data carrier of another band. By contrast, when the control channel is time division multiplexed with the data channel the same RF and baseband chain can be used. The control channel may use the same sampling rate as data channel, with longer cyclic prefix (CP) to limit the intersymbol interference (ISI) caused by omni transmission from all RRHs 140 comparing to the directional transmission in data channel.

Figure 3A:
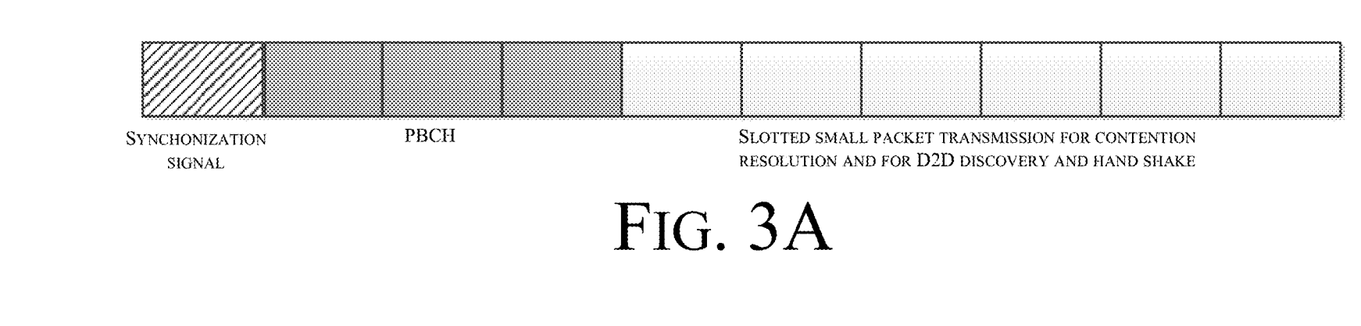
FIGS. 3A and 3B are schematic, block diagram illustrations of control channel structures for an exemplary communication system in accordance with various examples discussed herein.
Figure 3B:
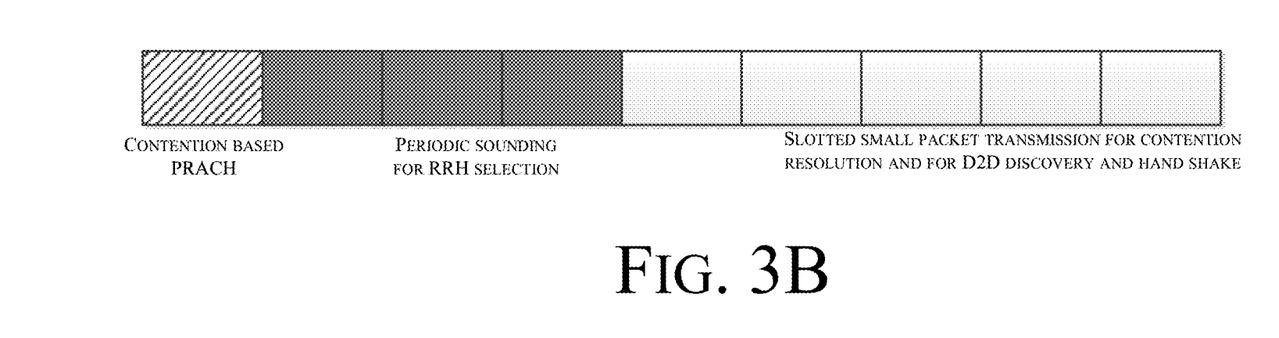
Figure 4:
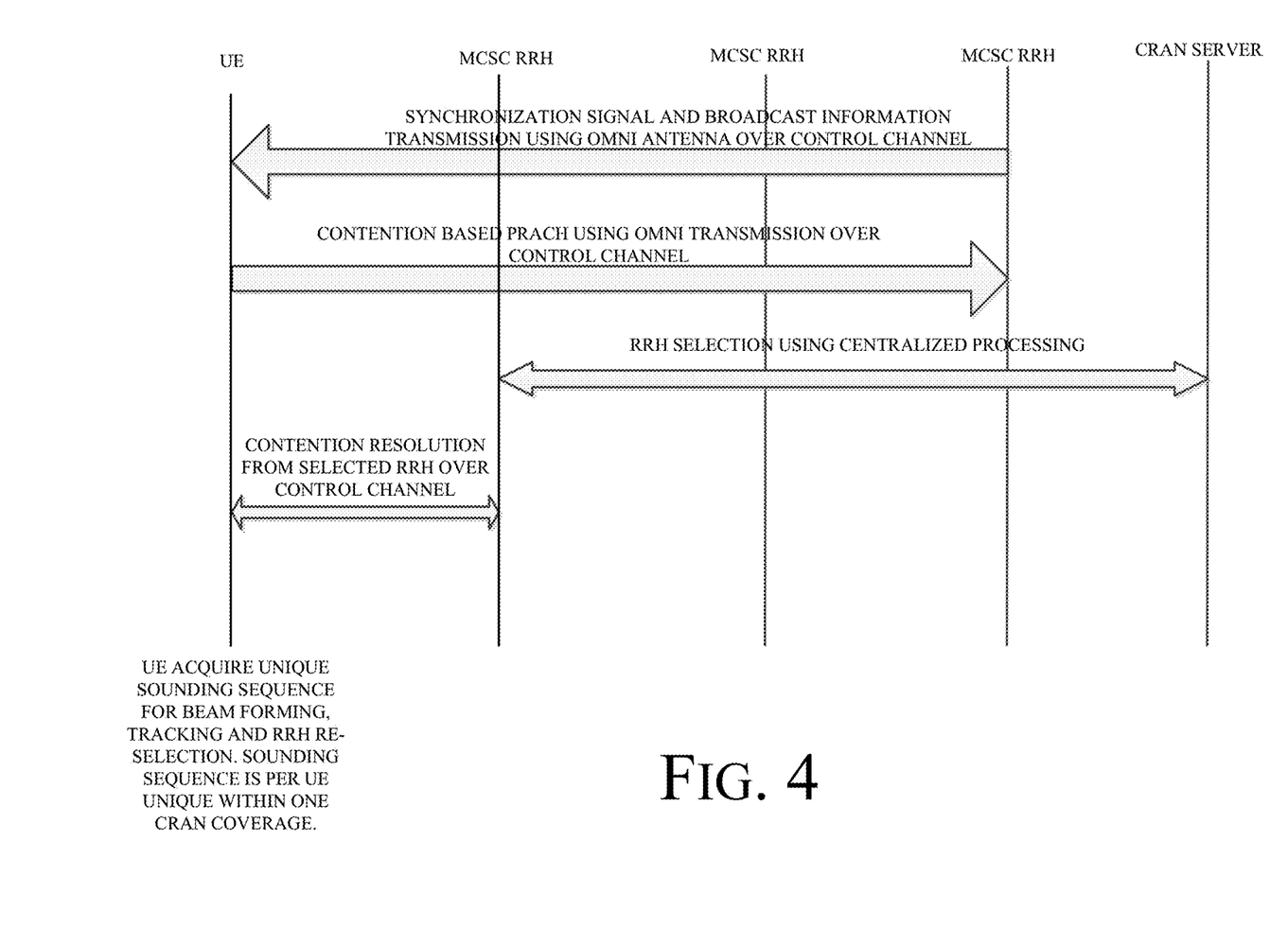
FIG. 4 is a diagram illustrating a network access process flow in an architecture for an exemplary communication system in accordance with various examples discussed herein.

An initial access protocol will be explained with reference to FIGS. 3A-3B and FIG. 4. FIGS. 3A and 3B are schematic, block diagram illustrations of control channel structures for an exemplary communication system in accordance with various examples discussed herein, and FIG. 4 is a diagram illustrating a network access process flow in an architecture for an exemplary communication system in accordance with various examples discussed herein. Note here the support of device-to-device (D2D) transmission/UE relay is supported as well. The control channel structure is describe in separate DL transmission and UL transmission and should be mapped into the TDD frame structures.

Referring to FIG. 4, a the RRHs 140 broadcast a control structure depicted in FIG. 3A for a downlink. Referring to FIG. 3A, the control structure includes a periodic transmission of synchronization signal and broadcast information in a physical broadcast channel. Other slots are used for short data transmission such as contention resolution or D2D discovery and link setup.

The UE broadcasts a control structure depicted in FIG. 3B for an uplink. Referring to FIG. 3B, the control structure includes reserved slots for PRACH (initial access), and uplink sounding (RRH selection). Other slots for short data packet transmission. Periodicity of PRACH, Sounding and slotted data transmission needs further study.

After the initial access, each UE 150 is assigned a unique UE identifier (ID). This unique UE ID replace the cell ID in a traditional cellular network and may be used as the identification for transmission point selection, beamforming training, DMRS scramble for channel estimation, and PDSCH/PUSCH transmission scrambling for interference mitigation.

Next a server from the server pool 130 implements an RRH selection procedure which selects one of the RRHs 140 to server as the transmission point (TP) for the UE 150. The transmit point is transparent to the UE, but visible to CRAN server which control the L2/L3 state. In some examples the received power strength of the sounding signaling for each UE is measured the RRH 140 which serves as a TP for a UE 150 may be determined by balancing the signal-to-noise ratio (SNR) and the traffic load for the respective RRHs 140. After the TP point selection, packet data control channel (PDCCH) will transmit to this UE, with downlink allocation for physical downlink shared channel (PDSCH) and RAR. The PDCCH may be scrambled by the unique UE ID.

In some examples, beamforming training can be part of the TP selection. For example, the TP may perform AoD (angle of departure) estimation using the sounding sequence, and after the UE may perform the AoA (angle of arrival) estimation when receiving synchronization signal in the control plane. Since the control band are either close to data band, or time division multiplexed together, the statistical AoA and AoD information trained through control plane is similar as data plane. In another embodiment, separate beamforming training on data plane can be done after TP is done.

In some examples a time division duplexing (TDD) frame structure similar to the current LTE TDD frame structure may be used, with different/smaller transmission time interval (TTI) for low latency data communication. Beamformed PDCCH, PDSCH, PUSCH, PUCCH designs may be implemented. The phy structure of those channel are likely be able to reuse the channels designed for mmWave RAT under anchor-booster architecture. The scrambling code for each channel is however UE-specific.

In some examples high levels of spectrum reuse (i.e., a high number of streams within the same cell ID from different TP) is enabled by the unique UE-specific scrambling codes. Cell-specific reference signals (CRS) are not required for channel estimation for demodulation.

Figure 5:
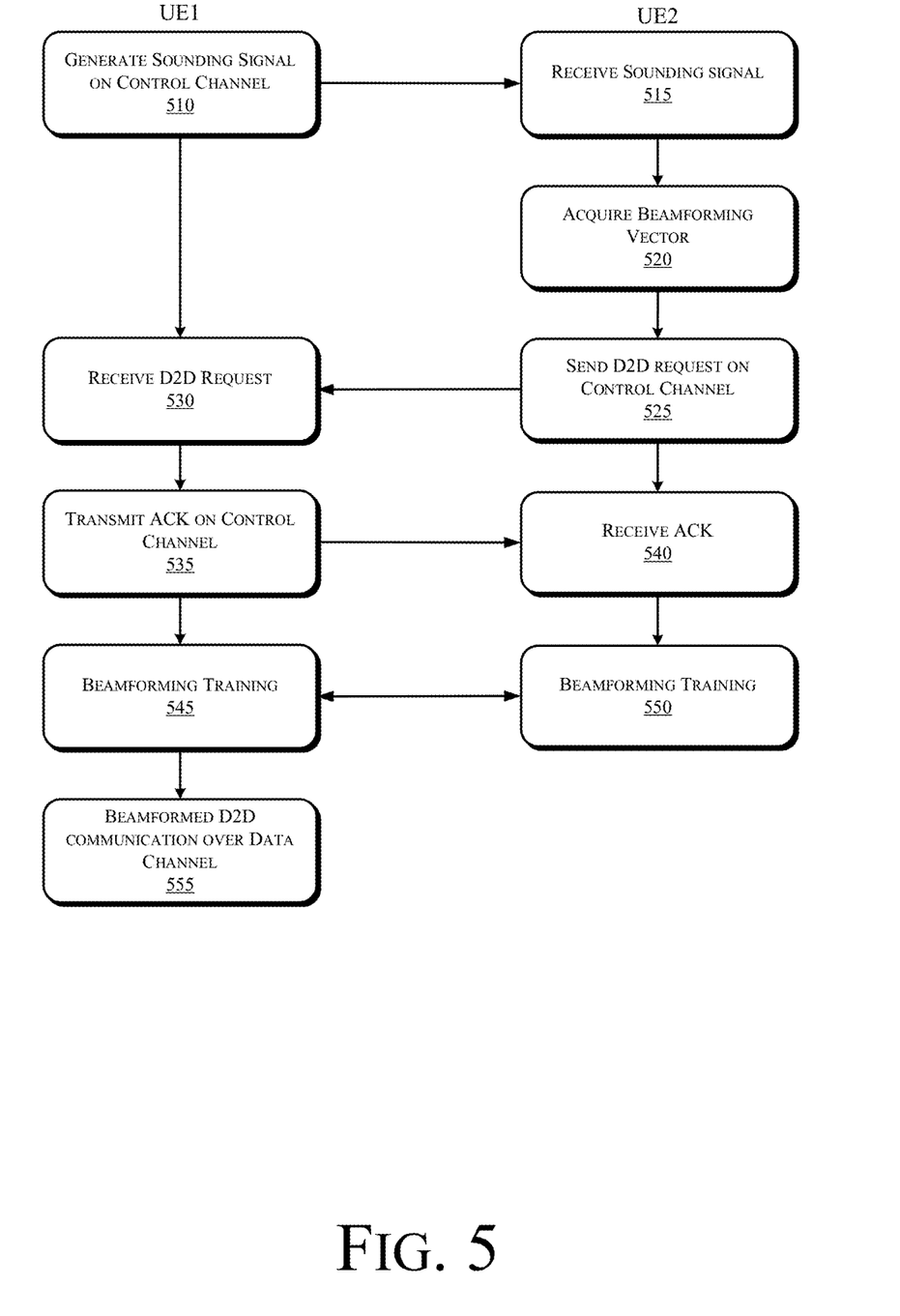
FIG. 5 is a flowchart illustrating operations in an architecture for an exemplary communication system in accordance with various examples discussed herein.

In some examples a device-to-device relay may be implemented to allow a first UE 150 to provide access to a second UE 150. FIG. 5 is a flowchart illustrating operations in an architecture for an exemplary communication system in accordance with various examples discussed herein.

Referring to FIG. 5, at operation 510 a first UE (UE1) generates and broadcasts a sounding signal on the control channel. At operation 515 a second UE (UE2) receives the sounding signal. At operation 520 UE2 acquires a beamforming vector for UE 1 and at operation 525 UE2 sends a device-to-device (D2D) request on the control channel. At operation 530 UE1 receives the D2D request from UE2 and at operation 535 UE1 transmits an acknowledgment (ACK) on the control channel, which is received by UE2 at operation 540.

At operations 545 and 550 the respective UEs implement a beamforming training process. At operation 555 UE1 provides beamformed D2D communication with UE2 over the data channel.

Figure 6:
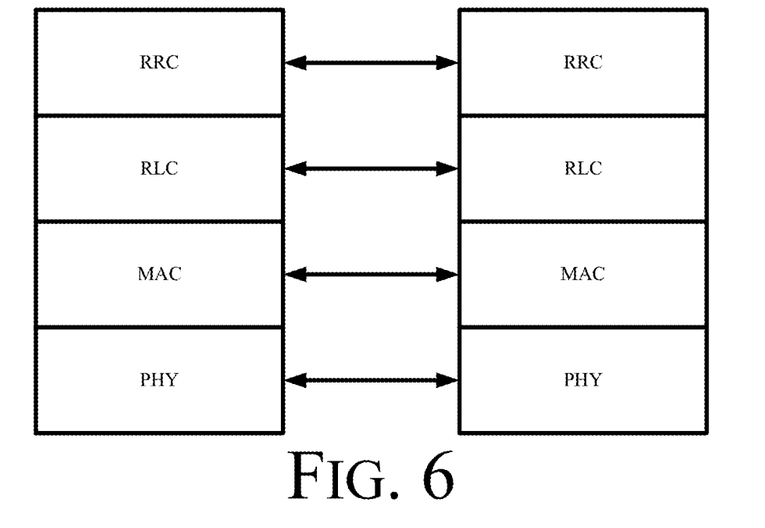
FIGS. 6 and 7 are schematic, block diagram illustrations, respectively, of radio interface protocol structures between a UE and an eNodeB based on a 3GPP-type radio access network standard in accordance with one or more exemplary embodiments disclosed herein.
Figure 7:
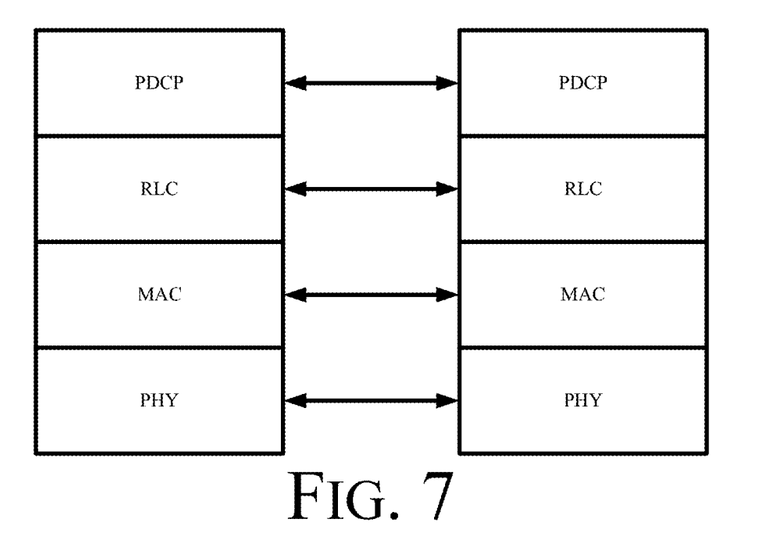

FIGS. 6 and 7 respectively depict exemplary radio interface protocol structures between a UE and an RRH that are based on a 3GPP-type radio access network standard and that is capable of providing an uplink-transmit-power control technique that reduces interference experienced at other user equipments according to the subject matter disclosed herein. More specifically, FIG. 6 depicts individual layers of a radio protocol control plane and FIG. 7 depicts individual layers of a radio protocol user plane. The protocol layers of FIGS. 6 and 7 can be classified into an L1 layer (first layer), an L2 layer (second layer) and an L3 layer (third layer) on the basis of the lower three layers of the OSI reference model widely known in communication systems.

The physical (PHY) layer, which is the first layer (L1), provides an information transfer service to an upper layer using a physical channel. The physical layer is connected to a Medium Access Control (MAC) layer, which is located above the physical layer, through a transport channel. Data is transferred between the MAC layer and the PHY layer through the transport channel. A transport channel is classified into a dedicated transport channel and a common transport channel according to whether or not the channel is shared. Data transfer between different physical layers, specifically between the respective physical layers of a transmitter and a receiver is performed through the physical channel.

A variety of layers exist in the second layer (L2 layer). For example, the MAC layer maps various logical channels to various transport channels, and performs logical-channel multiplexing for mapping various logical channels to one transport channel. The MAC layer is connected to the Radio Link Control (RLC) layer serving as an upper layer through a logical channel. The logical channel can be classified into a control channel for transmitting information of a control plane and a traffic channel for transmitting information of a user plane according to categories of transmission information.

The RLC layer of the second layer (L2) performs segmentation and concatenation on data received from an upper layer, and adjusts the size of data to be suitable for a lower layer transmitting data to a radio interval. In order to guarantee various Qualities of Service (QoSs) requested by respective radio bearers (RBs), three operation modes, i.e., a Transparent Mode (TM), an Unacknowledged Mode (UM), and an Acknowledged Mode (AM), are provided. Specifically, an AM RLC performs a retransmission function using an Automatic Repeat and Request (ARQ) function so as to implement reliable data transmission.

A Packet Data Convergence Protocol (PDCP) layer of the second layer (L2) performs a header compression function to reduce the size of an IP packet header having relatively large and unnecessary control information in order to efficiently transmit IP packets, such as IPv4 or IPv6 packets, in a radio interval with a narrow bandwidth. As a result, only information required for a header part of data can be transmitted, so that transmission efficiency of the radio interval can be increased. In addition, in an LTE-based system, the PDCP layer performs a security function that includes a ciphering function for preventing a third party from eavesdropping on data and an integrity protection function for preventing a third party from handling data.

A Radio Resource Control (RRC) layer located at the top of the third layer (L3) is defined only in the control plane and is responsible for control of logical, transport, and physical channels in association with configuration, re-configuration and release of Radio Bearers (RBs). The RB is a logical path that the first and second layers (L1 and L2) provide for data communication between the UE and the UTRAN. Generally, Radio Bearer (RB) configuration means that a radio protocol layer needed for providing a specific service, and channel characteristics are defined and their detailed parameters and operation methods are configured. The Radio Bearer (RB) is classified into a Signaling RB (SRB) and a Data RB (DRB). The SRB is used as a transmission passage of RRC messages in the C plane, and the DRB is used as a transmission passage of user data in the U plane.

A downlink transport channel for transmitting data from the network to the UE may be classified into a Broadcast Channel (BCH) for transmitting system information and a downlink Shared Channel (SCH) for transmitting user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Downlink physical channels for transmitting information transferred to a downlink transport channel to a radio interval between the UE and the network are classified into a Physical Broadcast Channel (PBCH) for transmitting BCH information, a Physical Multicast Channel (PMCH) for transmitting MCH information, a Physical Downlink Shared Channel (PDSCH) for transmitting downlink SCH information, and a Physical Downlink Control Channel (PDCCH) (also called a DL L1/L2 control channel) for transmitting control information, such as DL/UL Scheduling Grant information, received from first and second layers (L1 and L2). In the meantime, uplink physical channels for transmitting information transferred to an uplink transport channel to a radio interval between the UE and the network are classified into a Physical Uplink Shared Channel (PUSCH) for transmitting uplink SCH information, a Physical Random Access Channel for transmitting RACH information, and a Physical Uplink Control Channel (PUCCH) for transmitting control information, such as Hybrid Automatic Repeat Request (HARQ) ACK or NACK Scheduling Request (SR) and Channel Quality Indicator (CQI) report information, received from first and second layers (L1 and L2).

Figure 8:
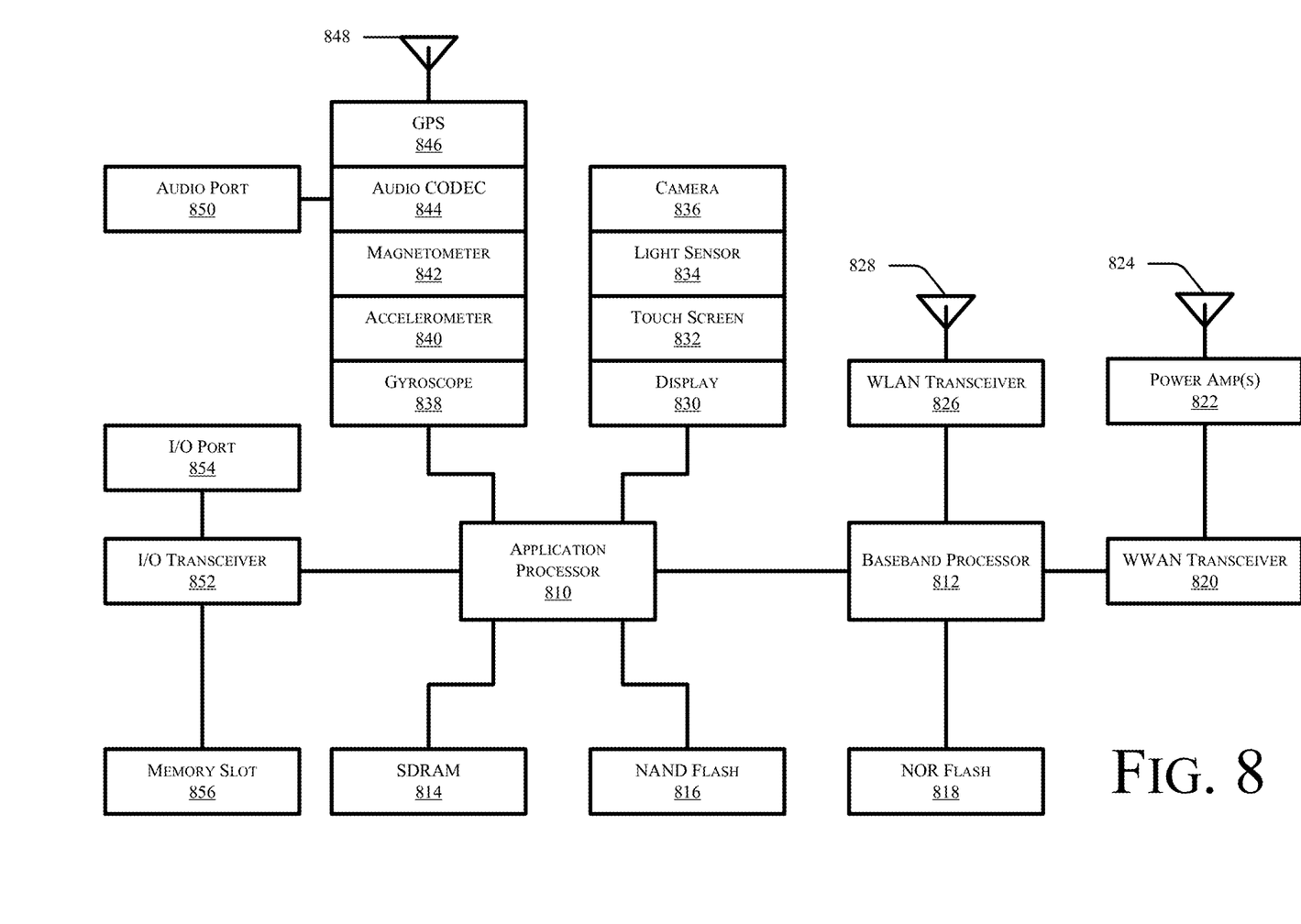
FIG. 8 is a schematic, block diagram illustration of an information-handling system in accordance with one or more exemplary embodiments disclosed herein.

FIG. 8 depicts an exemplary functional block diagram of an information-handling system 800 that is capable of implementing methods to identify victims and aggressors according to the subject matter disclosed herein. Information handling system 800 of FIG. 8 may tangibly embody one or more of any of the exemplary devices, exemplary network elements and/or functional entities of the network as shown in and described herein. In one example, information-handling system 800 may represent the components of user equipment 200, subscriber station 616, CPE 622, base stations 614 and 620, eNB 510, and/or UE 511, with greater or fewer components depending on the hardware specifications of the particular device or network element. In another example, information-handling system may provide M2M-type device capability. In yet another exemplary embodiment, information-handling system 800 is capable of providing an uplink-transmit-power control technique that reduces interference experienced at other user equipments according to the subject matter disclosed herein. Although information-handling system 800 represents one example of several types of computing platforms, information-handling system 800 may include more or fewer elements and/or different arrangements of elements than shown in FIG. 6, and the scope of the claimed subject matter is not limited in these respects.

In one or more examples, information-handling system 800 may comprise one or more applications processor 810 and a baseband processor 812. Applications processor 810 may be utilized as a general purpose processor to run applications and the various subsystems for information handling system 800, and to capable of providing an uplink-transmit-power control technique that reduces interference experienced at other user equipments according to the subject matter disclosed herein. Applications processor 810 may include a single core or alternatively may include multiple processing cores wherein one or more of the cores may comprise a digital signal processor or digital signal processing core. Furthermore, applications processor 810 may include a graphics processor or coprocessor disposed on the same chip, or alternatively a graphics processor coupled to applications processor 810 may comprise a separate, discrete graphics chip. Applications processor 810 may include on-board memory, such as cache memory, and further may be coupled to external memory devices such as synchronous dynamic random access memory (SDRAM) 814 for storing and/or executing applications, such as capable of providing an uplink-transmit-power control technique that reduces interference experienced at other user equipments according to the subject matter disclosed herein. During operation, and NAND flash 816 for storing applications and/or data even when information handling system 800 is powered off.

In one example, a list of candidate nodes may be stored in SDRAM 814 and/or NAND flash 816. Further, applications processor 810 may execute computer-readable instructions stored in SDRAM 814 and/or NAND flash 816 that result in an uplink-transmit-power control technique that reduces interference experienced at other user equipments according to the subject matter disclosed herein.

In one example, baseband processor 812 may control the broadband radio functions for information-handling system 800. Baseband processor 812 may store code for controlling such broadband radio functions in a NOR flash 818. Baseband processor 812 controls a wireless wide area network (WWAN) transceiver 820 which is used for modulating and/or demodulating broadband network signals, for example, for communicating via a 3GPP LTE network or the like as discussed herein with respect to FIG. 8. The WWAN transceiver 820 couples to one or more power amplifiers 822 that are respectively coupled to one or more antennas 824 for sending and receiving radio-frequency signals via the WWAN broadband network. The baseband processor 812 also may control a wireless local area network (WLAN) transceiver 826 coupled to one or more suitable antennas 828 and that may be capable of communicating via a Bluetooth-based standard, an IEEE 802.11-based standard, an IEEE 802.16-based standard, an IEEE 802.18-based wireless network standard, a 3GPP-based protocol wireless network, a Third Generation Partnership Project Long Term Evolution (3GPP LTE) based wireless network standard, a 3GPP2 Air Interface Evolution (3GPP2 AIE) based wireless network standard, a 3GPP-LTE-Advanced-based wireless network, a UMTS-based protocol wireless network, a CDMA2000-based protocol wireless network, a GSM-based protocol wireless network, a cellular-digital-packet-data-based (CDPD-based) protocol wireless network, a Mobitex-based protocol wireless network, a Near-Field-Communications-based (NFC-based) link, a WiGig-based network, a ZigBee-based network, or the like. It should be noted that these are merely exemplary implementations for applications processor 810 and baseband processor 812, and the scope of the claimed subject matter is not limited in these respects. For example, any one or more of SDRAM 814, NAND flash 816 and/or NOR flash 818 may comprise other types of memory technology, such as magnetic-based memory, chalcogenide-based memory, phase-change-based memory, optical-based memory, or ovonic-based memory, and the scope of the claimed subject matter is not limited in this respect.

In one or more embodiments, applications processor 810 may drive a display 830 for displaying various information or data, and may further receive touch input from a user via a touch screen 832, for example, via a finger or a stylus. In one exemplary embodiment, screen 832 display a menu and/or options to a user that are selectable via a finger and/or a stylus for entering information into information-handling system 800.

An ambient light sensor 834 may be utilized to detect an amount of ambient light in which information-handling system 800 is operating, for example, to control a brightness or contrast value for display 830 as a function of the intensity of ambient light detected by ambient light sensor 834. One or more cameras 836 may be utilized to capture images that are processed by applications processor 810 and/or at least temporarily stored in NAND flash 816. Furthermore, applications processor may be coupled to a gyroscope 838, accelerometer 840, magnetometer 842, audio coder/decoder (CODEC) 844, and/or global positioning system (GPS) controller 846 coupled to an appropriate GPS antenna 848, for detection of various environmental properties including location, movement, and/or orientation of information-handling system 800. Alternatively, controller 846 may comprise a Global Navigation Satellite System (GNSS) controller. Audio CODEC 844 may be coupled to one or more audio ports 850 to provide microphone input and speaker outputs either via internal devices and/or via external devices coupled to information-handling system via the audio ports 850, for example, via a headphone and microphone jack. In addition, applications processor 810 may couple to one or more input/output (I/O) transceivers 852 to couple to one or more I/O ports 854 such as a universal serial bus (USB) port, a high-definition multimedia interface (HDMI) port, a serial port, and so on. Furthermore, one or more of the I/O transceivers 852 may couple to one or more memory slots 856 for optional removable memory, such as secure digital (SD) card or a subscriber identity module (SIM) card, although the scope of the claimed subject matter is not limited in these respects.

Figure 9:
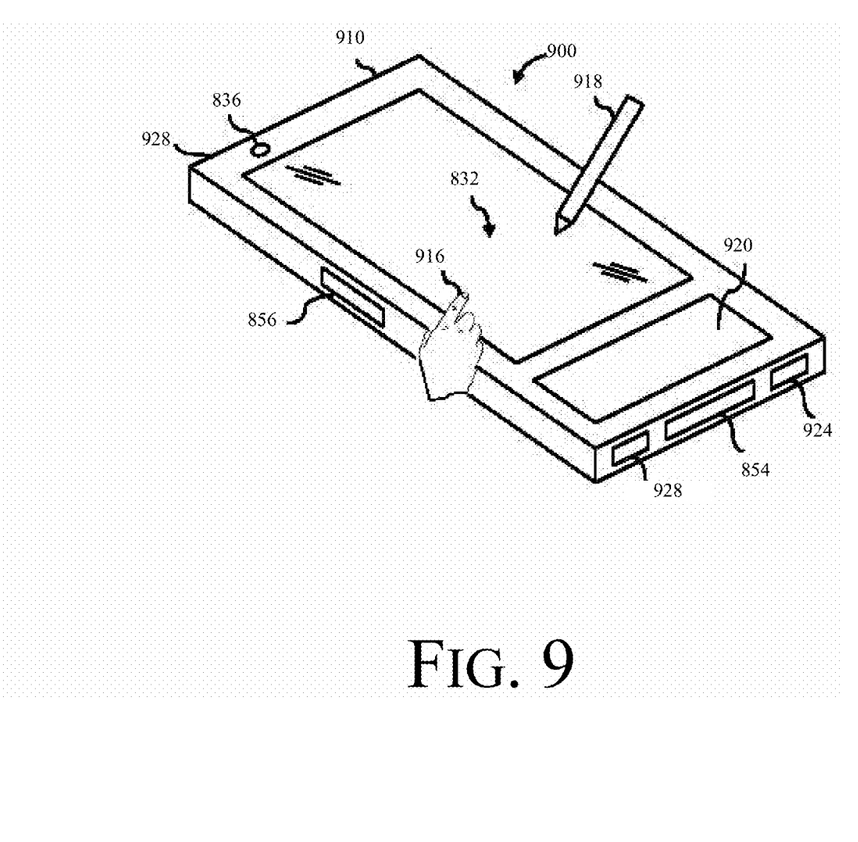
FIG. 9 is an isometric view of an exemplary embodiment of the information-handling system of FIG. 10 that optionally may include a touch screen in accordance with one or more embodiments disclosed herein.

FIG. 9 depicts an isometric view of an exemplary embodiment of the information-handling system of FIG. 8 that optionally may include a touch screen in accordance with one or more embodiments disclosed herein. FIG. 9 shows an example implementation of information-handling system 800 of FIG. 8 tangibly embodied as a cellular telephone, smartphone, smart-type device, or tablet-type device or the like, that is capable of implementing methods to identify victims and aggressors according to the subject matter disclosed herein. In one or more embodiments, the information-handling system 800 may comprise any one of the infrastructure nodes, user equipment 400, subscriber station 616, CPE 622, mobile station UE 511 of FIG. 5, and/or an M2M-type device, although the scope of the claimed subject matter is not limited in this respect. The information-handling system 800 may comprise a housing 910 having a display 830 that may include a touch screen 832 for receiving tactile input control and commands via a finger 916 of a user and/or a via stylus 918 to control one or more applications processors 810. The housing 910 may house one or more components of information-handling system 800, for example, one or more applications processors 810, one or more of SDRAM 814, NAND flash 816, NOR flash 818, baseband processor 812, and/or WWAN transceiver 820. The information-handling system 800 further may optionally include a physical actuator area 920 which may comprise a keyboard or buttons for controlling information-handling system 800 via one or more buttons or switches. The information-handling system 800 may also include a memory port or slot 856 for receiving non-volatile memory, such as flash memory, for example, in the form of a secure digital (SD) card or a subscriber identity module (SIM) card. Optionally, the information-handling system 800 may further include one or more speakers and/or microphones 924 and a connection port 854 for connecting the information-handling system 800 to another electronic device, dock, display, battery charger, and so on. Additionally, information-handling system 800 may include a headphone or speaker jack 928 and one or more cameras 836 on one or more sides of the housing 910. It should be noted that the information-handling system 800 of FIGS. 8 and 9 may include more or fewer elements than shown, in various arrangements, and the scope of the claimed subject matter is not limited in this respect.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 10:
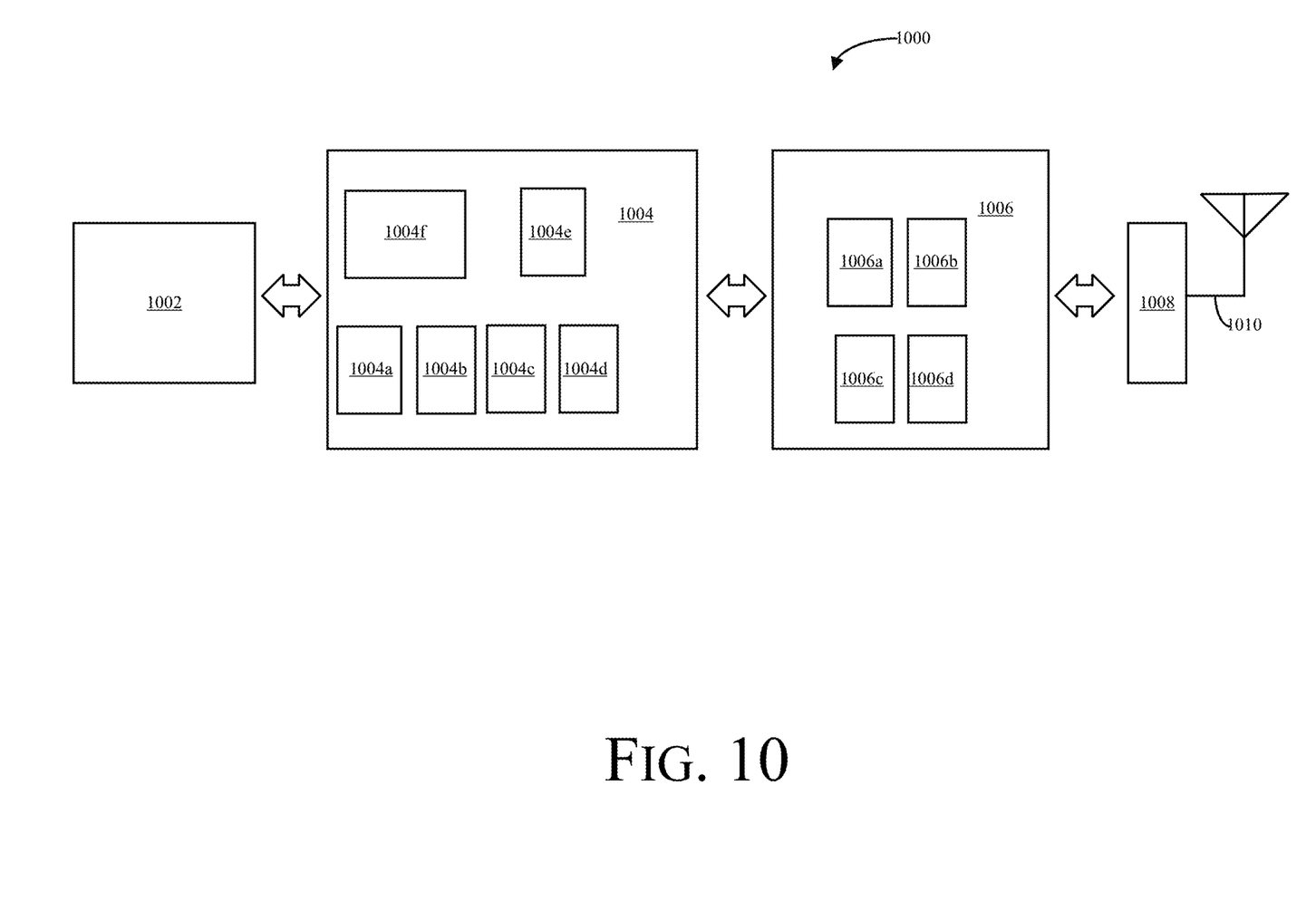
FIG. 10 is a schematic, block diagram illustration of components of user equipment in accordance with one or more exemplary embodiments disclosed herein.

Embodiments described herein may be implemented into a system using any suitably configured hardware and/or software. FIG. 10 illustrates, for one embodiment, example components of a User Equipment (UE) device 1000. In some embodiments, the UE device 1000 may include application circuitry 1002, baseband circuitry 1004, Radio Frequency (RF) circuitry 1006, front-end module (FEM) circuitry 1008 and one or more antennas 1010, coupled together at least as shown.

The application circuitry 1002 may include one or more application processors. For example, the application circuitry 1002 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1004 may include circuitry such as, but not limited to, one or more single-core or multi-core processors. The baseband circuitry 1004 may include one or more baseband processors and/or control logic to process baseband signals received from a receive signal path of the RF circuitry 1006 and to generate baseband signals for a transmit signal path of the RF circuitry 1006. Baseband processing circuity 1004 may interface with the application circuitry 1002 for generation and processing of the baseband signals and for controlling operations of the RF circuitry 1006. For example, in some embodiments, the baseband circuitry 1004 may include a second generation (2G) baseband processor 1004a, third generation (3G) baseband processor 1004b, fourth generation (4G) baseband processor 1004c, and/or other baseband processor(s) 1004d for other existing generations, generations in development or to be developed in the future (e.g., fifth generation (5G), 6G, etc.). The baseband circuitry 1004 (e.g., one or more of baseband processors 1004a-d) may handle various radio control functions that enable communication with one or more radio networks via the RF circuitry 1006. The radio control functions may include, but are not limited to, signal modulation/demodulation, encoding/decoding, radio frequency shifting, etc. In some embodiments, modulation/demodulation circuitry of the baseband circuitry 1004 may include Fast-Fourier Transform (FFT), precoding, and/or constellation mapping/demapping functionality. In some embodiments, encoding/decoding circuitry of the baseband circuitry 1004 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1004e of the baseband circuitry 1004 may be configured to run elements of the protocol stack for signaling of the PHY, MAC, RLC, PDCP and/or RRC layers. In some embodiments, the baseband circuitry may include one or more audio digital signal processor(s) (DSP) 1004f. The audio DSP(s) 1004f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1004 and the application circuitry 1002 may be implemented together such as, for example, on a system on a chip (SOC).

In some embodiments, the baseband circuitry 1004 may provide for communication compatible with one or more radio technologies. For example, in some embodiments, the baseband circuitry 1004 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 1004 is configured to support radio communications of more than one wireless protocol may be referred to as multi-mode baseband circuitry.

RF circuitry 1006 may enable communication with wireless networks using modulated electromagnetic radiation through a non-solid medium. In various embodiments, the RF circuitry 1006 may include switches, filters, amplifiers, etc. to facilitate the communication with the wireless network. RF circuitry 1006 may include a receive signal path which may include circuitry to down-convert RF signals received from the FEM circuitry 1008 and provide baseband signals to the baseband circuitry 1004. RF circuitry 1006 may also include a transmit signal path which may include circuitry to up-convert baseband signals provided by the baseband circuitry 1004 and provide RF output signals to the FEM circuitry 1008 for transmission.

In some embodiments, the RF circuitry 1006 may include a receive signal path and a transmit signal path. The receive signal path of the RF circuitry 1006 may include mixer circuitry 1006a, amplifier circuitry 1006b and filter circuitry 1006c. The transmit signal path of the RF circuitry 1006 may include filter circuitry 1006c and mixer circuitry 1006a. RF circuitry 1006 may also include synthesizer circuitry 1006d for synthesizing a frequency for use by the mixer circuitry 1006a of the receive signal path and the transmit signal path. In some embodiments, the mixer circuitry 1006a of the receive signal path may be configured to down-convert RF signals received from the FEM circuitry 1008 based on the synthesized frequency provided by synthesizer circuitry 1006d. The amplifier circuitry 1006b may be configured to amplify the down-converted signals and the filter circuitry 1006c may be a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may be zero-frequency baseband signals, although this is not a requirement. In some embodiments, mixer circuitry 1006a of the receive signal path may comprise passive mixers, although the scope of the embodiments is not limited in this respect.

In some embodiments, the mixer circuitry 1006a of the transmit signal path may be configured to up-convert input baseband signals based on the synthesized frequency provided by the synthesizer circuitry 1006d to generate RF output signals for the FEM circuitry 1008. The baseband signals may be provided by the baseband circuitry 1004 and may be filtered by filter circuitry 1006c. The filter circuitry 1006c may include a low-pass filter (LPF), although the scope of the embodiments is not limited in this respect.

In some embodiments, the mixer circuitry 1006a of the receive signal path and the mixer circuitry 1006a of the transmit signal path may include two or more mixers and may be arranged for quadrature downconversion and/or upconversion respectively. In some embodiments, the mixer circuitry 1006a of the receive signal path and the mixer circuitry 1006a of the transmit signal path may include two or more mixers and may be arranged for image rejection (e.g., Hartley image rejection). In some embodiments, the mixer circuitry 1006a of the receive signal path and the mixer circuitry 1006a may be arranged for direct downconversion and/or direct upconversion, respectively. In some embodiments, the mixer circuitry 1006a of the receive signal path and the mixer circuitry 1006a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 1004 may include a digital baseband interface to communicate with the RF circuitry 1006.

In some dual-mode embodiments, a separate radio IC circuitry may be provided for processing signals for each spectrum, although the scope of the embodiments is not limited in this respect.

In some embodiments, the synthesizer circuitry 1006d may be a fractional-N synthesizer or a fractional N/N+1 synthesizer, although the scope of the embodiments is not limited in this respect as other types of frequency synthesizers may be suitable. For example, synthesizer circuitry 1006d may be a delta-sigma synthesizer, a frequency multiplier, or a synthesizer comprising a phase-locked loop with a frequency divider.

The synthesizer circuitry 1006d may be configured to synthesize an output frequency for use by the mixer circuitry 1006a of the RF circuitry 1006 based on a frequency input and a divider control input. In some embodiments, the synthesizer circuitry 1006d may be a fractional N/N+1 synthesizer.

In some embodiments, frequency input may be provided by a voltage controlled oscillator (VCO), although that is not a requirement. Divider control input may be provided by either the baseband circuitry 1004 or the applications processor 1002 depending on the desired output frequency. In some embodiments, a divider control input (e.g., N) may be determined from a look-up table based on a channel indicated by the applications processor 1002.

Synthesizer circuitry 1006d of the RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1006 may include an IQ/polar converter.

FEM circuitry 1008 may include a receive signal path which may include circuitry configured to operate on RF signals received from one or more antennas 1010, amplify the received signals and provide the amplified versions of the received signals to the RF circuitry 1006 for further processing. FEM circuitry 1008 may also include a transmit signal path which may include circuitry configured to amplify signals for transmission provided by the RF circuitry 1006 for transmission by one or more of the one or more antennas 1010.

In some embodiments, the FEM circuitry 1008 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1006). The transmit signal path of the FEM circuitry 1008 may include a power amplifier (PA) to amplify input RF signals (e.g., provided by RF circuitry 1006), and one or more filters to generate RF signals for subsequent transmission (e.g., by one or more of the one or more antennas 1010.

In some embodiments, the UE device 1000 may include additional elements such as, for example, memory/storage, display, camera, sensor, and/or input/output (I/O) interface.

In a first non-limiting example a network entity comprises processing circuitry to define a downlink control channel comprising a synchronization signal, a physical broadcast channel (PBCH), and at least one slot for contention resolution or device-to-device (D2D) discovery and link setup, and broadcast a synchronization signal comprising the control channel from a plurality of remote radio heads (RRH). In some examples the control channel has a dedicated bandwidth separate from a data channel and/or may be implemented using a bandwidth adjacent to from the data channel. In some examples the control channel is multiplexed with a data channel using either frequency division multiplexing (FDM) or time division multiplexing (TDM). In some examples the network entity comprises processing circuitry to receive an initial access request form a user equipment (UE) via an uplink control channel comprising a sounding signal, a physical random access channel (PRACH), and at least one slot for contention resolution or device-to-device (D2D) discovery and link setup, assign a unique identifier to the UE, and select a RRH to provide a transmission point (TP) to the UE. In some examples the processing circuitry to select a RRH to provide a TP to the UE may comprise processing circuitry to measure a received power strength of the sounding signal, and select a RRH to provide a transmission point based at least in part on a signal to noise ratio (SNR) of the sounding signal. In some examples the network entity compriss processing circuitry to implement a beamforming training procedure between the TP and the UE and/or to estimate an angle of departure of a signal from the UE using the sounding signal from the UE.

In another non-limiting example user equipment (UE) comprises processing circuitry to receive a synchronization signal comprising the control channel from a plurality of remote radio heads (RRH), transmit an initial access request via an uplink control channel comprising a sounding signal, a physical random access channel (PRACH) and at least one slot for contention resolution or device-to-device (D2D) discovery and link setup, and receive a unique identifier for the UE, and receive an identifier for an RRH designed to provide a transmission point (TP) to the UE. In some examples the initial access request is broadcast using an omnidirectional antenna. In some examples the user equipment comprises processing circuitry to implement a contention resolution procedure with the RRH designated to provide a TP to the UE and/or to implement a device-to-device (D2D) relay to provide access to the RRH acting as a TP for the UE to a second UE. In some examples the user equipment further comprises processing circuitry to receive a request from the second UE for a D2D relay and implement a beamforming training process with the second UE.

In another non-limiting example an article of manufacture comprises a non-transitory storage medium having instructions stored thereon that, when executed by a processor, configure the processor to define a downlink control channel comprising a synchronization signal, a physical broadcast channel (PBCH), and at least one slot for contention resolution or device-to-device (D2D) discovery and link setup, and broadcast a synchronization signal comprising the control channel from a plurality of remote radio heads (RRH). In some examples the control channel has a dedicated bandwidth separate from a data channel and/or is implemented using a bandwidth adjacent to from the data channel. In some examples the control channel is multiplexed with a data channel using either frequency division multiplexing (FDM) or time division multiplexing (TDM). In some examples the article of manufacture further comprises instructions stored on the non-transitory storage medium what, when executed by the processor, configure the processor to receive an initial access request form a user equipment (UE) via an uplink control channel comprising a sounding signal, a physical random access channel (PRACH), and at least one slot for contention resolution or device-to-device (D2D) discovery and link setup, assign a unique identifier to the UE and select a RRH to provide a transmission point (TP) to the UE. In some examples the article of manufacture further comprises instructions stored on the non-transitory storage medium what, when executed by the processor, configure the processor to measure a received power strength of the sounding signal and select a RRH to provide a transmission point based at least in part on a signal to noise ratio (SNR) of the sounding signal. In some examples the article of manufacture of claim 19, further comprising instructions stored on the non-transitory storage medium what, when executed by the processor, configure the processor to implement a beamforming training procedure between the TP and the UE and/or to estimate an angle of departure of a signal from the UE using the sounding signal from the UE.

In another non-limiting example an article of manufacture comprising a non-transitory storage medium having instructions stored thereon that, when executed by a processor, configure the processor to receive a synchronization signal comprising the control channel from a plurality of remote radio heads (RRH), transmit an initial access request via an uplink control channel comprising a sounding signal, a physical random access channel (PRACH), and at least one slot for contention resolution or device-to-device (D2D) discovery and link setup, receive a unique identifier for the UE, and receive an identifier for an RRH designed to provide a transmission point (TP) to the UE. In some examples the initial access request is broadcast using an omnidirectional antenna. In some examples the article of manufacture further comprises instructions stored on the non-transitory storage medium what, when executed by the processor, configure the processor to implement a contention resolution procedure with the RRH designated to provide a TP to the UE. In some examples the article of manufacture further comprises instructions stored on the non-transitory storage medium what, when executed by the processor, configure the processor to implement a device-to-device (D2D) relay to provide access to the RRH acting as a TP for the UE to a second UE. In some examples the article of manufacture further comprises instructions stored on the non-transitory storage medium what, when executed by the processor, configure the processor to receive a request from the second UE for a D2D relay and implement a beamforming training process with the second UE.

In various examples, the operations discussed herein may be implemented as hardware (e.g., circuitry), software, firmware, microcode, or combinations thereof, which may be provided as a computer program product, e.g., including a tangible (e.g., non-transitory) machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed herein.

Reference in the specification to "one example" or "an example" means that a particular feature, structure, or characteristic described in connection with the example may be included in at least an implementation. The appearances of the phrase "in one example" in various places in the specification may or may not be all referring to the same example.

Also, in the description and claims, the terms "coupled" and "connected," along with their derivatives, may be used. In some examples, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although examples have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A network entity comprising processing circuitry to:
define a downlink control channel comprising:
   a synchronization signal;
   a physical broadcast channel (PBCH); and
   at least one slot for contention resolution or device-to-device (D2D) discovery and link setup;
broadcast a synchronization signal comprising the control channel from a plurality of remote radio heads (RRH) communicatively coupled to the network entity;
receive an initial access request form a user equipment (UE) via an uplink control channel comprising:
   a sounding signal to facilitate RRH selection;
   a physical random access channel (PRACH) to facilitate initial access; and
   at least one slot for contention resolution or device-to-device (D2D) discovery and link setup;
assign a unique identifier to the UE;
select a RRH to provide a transmission point (TP) to the UE;
measure a received power strength of the sounding signal; and
select a RRH to provide a transmission point based at least in part on a signal to noise ratio (SNR) of the sounding signal.

2. The network entity of claim 1, wherein the control channel has a dedicated bandwidth separate from a data channel.

3. The network entity of claim 2, wherein the control channel is implemented using a bandwidth adjacent to from the data channel.

4. The network entity of claim 1, wherein the control channel is multiplexed with a data channel using either frequency division multiplexing (FDM) or time division multiplexing (TDM).

5. The network entity of claim 1, further comprising processing circuitry to:
implement a beamforming training procedure between the TP and the UE.

6. The network entity of claim 5, wherein the processing circuitry to implement the beamforming training procedure further comprises processing circuitry to:
estimate an angle of departure of a signal from the UE using the sounding signal from the UE.

7. User equipment (UE) comprising processing circuitry to:
receive a synchronization signal comprising the control channel from a plurality of remote radio heads (RRH), wherein the control channel comprising: the synchronization signal, physical broadcast channel (PBCH), and at least one slot for contention resolution or device-to-device (D2D) discovery and link setup;
transmit an initial access request via an uplink control channel comprising:
   a sounding signal;
   a physical random access channel (PRACH); and
   at least one slot for contention resolution or device-to-device (D2D) discovery and link setup;
receive a unique identifier for the UE; and
receive an identifier for an RRH designed designated to provide a transmission point (TP) to the UE, the RRH designated to provide the TP to the UE selected based at least in part on a signal to noise ratio of the sounding signal determined by processing circuitry associated with the plurality of RRH.

8. The user equipment of claim 7, wherein the initial access request is broadcast using an omnidirectional antenna.

9. The user equipment of claim 7, further comprising processing circuitry to:
implement a contention resolution procedure with the RRH designated to provide a TP to the UE.

10. The user equipment of claim 7, further comprising processing circuitry to:
implement a device-to-device (D2D) relay to provide access to the RRH acting as a TP for the UE to a second UE.

11. The user equipment of claim 10, further comprising processing circuitry to:
receive a request from the second UE for a D2D relay; and
implement a beamforming training process with the second UE.

12. An article of manufacture comprising a non-transitory storage medium having instructions stored thereon that, when executed by a processor, configure the processor to:
define a downlink control channel comprising:
   a synchronization signal;
   a physical broadcast channel (PBCH); and at least one slot for contention resolution or device-to-device (D2D) discovery and link setup; and broadcast a synchronization signal comprising the control channel from a plurality of remote radio heads (RRH) communicatively coupled to the network entity;

receive an initial access request form a user equipment (UE) via an uplink control channel comprising:
- a sounding signal to facilitate RRH selection;
- a physical random access channel (PRACH) to facilitate initial access; and
- at least one slot for contention resolution or device-to-device (D2D) discovery and link setup;

assign a unique identifier to the UE;

select a RRH to provide a transmission point (TP) to the UE;

measure a received power strength of the sounding signal; and select a RRH to provide a transmission point based at least in part on a signal to noise ratio (SNR) of the sounding signal.

13. The article of manufacture of claim 12, wherein the control channel has a dedicated bandwidth separate from a data channel.

14. The article of manufacture of claim 13, wherein the control channel is implemented using a bandwidth adjacent to from the data channel.

15. The article of manufacture of claim 12, wherein the control channel is multiplexed with a data channel using either frequency division multiplexing (FDM) or time division multiplexing (TDM).

16. The article of manufacture of claim 12, further comprising instructions stored on the non-transitory storage medium what, when executed by the processor, configure the processor to:
implement a beamforming training procedure between the TP and the UE.

17. The article of manufacture of claim 16, further comprising instructions stored on the non-transitory storage medium what, when executed by the processor, configure the processor to:
estimate an angle of departure of a signal from the UE using the sounding signal from the UE.

18. An article of manufacture comprising a non-transitory storage medium having instructions stored thereon that, when executed by a processor, configure the processor to:

receive a synchronization signal comprising the control channel from a plurality of remote radio heads (RRH), wherein the control channel comprising: the synchronization signal, physical broadcast channel (PBCH), and at least one slot for contention resolution or device-to-device (D2D) discovery and link setup;

transmit an initial access request via an uplink control channel comprising:
- a sounding signal;
- a physical random access channel (PRACH); and
- at least one slot for contention resolution or device-to-device (D2D) discovery and link setup;

receive a unique identifier for the UE; and receive an identifier for an RRH designed designated to provide a transmission point (TP) to the UE, the RRH designated to provide the TP to the UE selected based at least in part on a signal to noise ratio of the sounding signal determined by processing circuitry associated with the plurality of RRH.

19. The article of manufacture of claim 18, wherein the initial access request is broadcast using an omnidirectional antenna.

20. The article of manufacture of claim 18, further comprising instructions stored on the non-transitory storage medium what, when executed by the processor, configure the processor to:
implement a contention resolution procedure with the RRH designated to provide a TP to the UE.

21. The article of manufacture of claim 18, further comprising instructions stored on the non-transitory storage medium what, when executed by the processor, configure the processor to:
implement a device-to-device (D2D) relay to provide access to the RRH acting as a TP for the UE to a second UE.

22. The article of manufacture of claim 18, further comprising instructions stored on the non-transitory storage medium what, when executed by the processor, configure the processor to:
receive a request from the second UE for a D2D relay; and
implement a beamforming training process with the second UE.

* * * * *